United States Patent
Nakamura

(10) Patent No.: US 7,039,998 B2
(45) Date of Patent: May 9, 2006

(54) METHOD OF ASSEMBLING GROMMET AND JIG FOR ASSEMBLING GROMMET

(75) Inventor: Yoshio Nakamura, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 203 days.

(21) Appl. No.: 10/736,774

(22) Filed: Dec. 17, 2003

(65) Prior Publication Data

US 2004/0163230 A1    Aug. 26, 2004

(30) Foreign Application Priority Data

Dec. 17, 2002    (JP) ................... P. 2002-365715

(51) Int. Cl.
*B23Q 3/00*    (2006.01)
*B23Q 7/00*    (2006.01)
(52) U.S. Cl. .......................... 29/464; 29/559
(58) Field of Classification Search ................. 29/464, 29/428, 281.1, 559; 269/47, 303, 310, 317, 269/903
See application file for complete search history.

(56) References Cited

U.S. PATENT DOCUMENTS 5,338,014 A * 8/1994 Kitamura ................... 269/47

FOREIGN PATENT DOCUMENTS

| JP | 2-118416 U | 9/1990 |
| JP | 3-126315 U | 12/1991 |
| JP | 410257648 | * 9/1998 |

\* cited by examiner

*Primary Examiner*—John C. Hong
(74) *Attorney, Agent, or Firm*—Sughrue Mion, PLLC

(57) ABSTRACT

A method of assembling a grommet, comprising the steps of: providing a grommet assembling jig which has a mounting portion and a guide portion; providing a first division body which has a seal portion; providing a second division body which has a fixing portion, the first division body and the second division body constituting the grommet; mounting the first division body on the grommet assembling jig so that the seal portion is fitted on the mounting portion; arranging a wire harness on the first division body; and assembling the second division body with the first division body by guiding the guide portion to the fixing portion.

3 Claims, 7 Drawing Sheets

METHOD OF ASSEMBLING GROMMET AND JIG FOR ASSEMBLING GROMMET

BACKGROUND OF THE INVENTION

The present invention relates to a method of assembling a grommet and a jig for assembling a grommet used for drawing out a wire harness from a case, for example, a waterproof box containing a control unit or the like at inside thereof.

For example, JP-UM-A-3-126315 discloses a related grommet used in a waterproof box. As shown in FIGS. 8A and 8B, a related grommet 80 is formed with a second thick-walled peripheral wall portion 83 at a middle portion of a bellows-like barrel portion 82 of a grommet main body 81 and formed with a fitting groove 84 and a guide projected streak 85 constituting a fitting portion for fitting to a rigid plate on a periphery of the second thick-walled peripheral wall portion 83.

A lower half 85 of the second thick-walled peripheral wall portion 83 is formed in a semicircular shape and an upper half 86 thereof is formed in a rectangular shape. Further, a first thick-walled peripheral wall portion 87 on a front end side is formed also by a similar shape to be larger by one size and an inner periphery thereof is formed with a fitting groove 88 for fitting to a rigid member. An outer peripheral portion of the first thick-walled peripheral wall portion is formed with an upper end rip 89.

According to the grommet 80, the rigid member is fitted onto the inner periphery of the first thick-walled peripheral wall portion 87 on the front end side of the grommet main body 81, a locking claw thereof is inserted to lock into a locking frame portion of a lower case and a sliding projected streak 90 and a sliding peripheral groove 91 of the first thick-walled peripheral wall portion 87 and a guide groove and a guide projected streak of the lower case are fitted to each other. An upper case having a packing for the upper end lip 89 is made to cover an upper side of the first thick-walled peripheral wall portion 87.

Further, the fitting groove 84 of the second thick-walled peripheral wall portion 83 on the middle side and a guide projected streak and a fitting groove are fitted each other and the locking claw of the lower side rigid plate is inserted to lock to a locking frame portion of a wall plate of a heat shielding plate or the like. An upper wall is fitted to fixed to a fitting plate of the upper side unit plate.

However, in the case of the above related grommet, it is necessary to perform a fitting operation after positioning both of the rigid members constituted by two parts and there is a problem that fitting operability is poor.

SUMMARY OF THE INVENTION

It is therefore an object of the present invention to provide a method of assembling a grommet and a jig for assembling a grommet facilitating operation of positioning both of the members and capable of promoting fitting operability.

In order to achieve the above object, according to the present invention, there is provided a method of assembling a grommet, comprising the steps of:

providing a grommet assembling jig which has a mounting portion and a guide portion;

providing a first division body which has a seal portion;

providing a second division body which has a fixing portion, the first division body and the second division body constituting the grommet;

mounting the first division body on the grommet assembling jig so that the seal portion is fitted on the mounting portion;

arranging a wire harness on the first division body; and assembling the second division body with the first division body by guiding the guide portion to the fixing portion.

Preferably, the fixing portion has a through hole. The guide portion passes through the through hole of the fixing portion in the assembling step.

Preferably, the method further comprises the steps of:

providing a box body which has a notched opening portion corresponding to the mounting portion and which has an engagement portion;

removing the grommet assembling jig from the first and second division bodies after the assembling step; and mounting the assembled first and second division bodies to the box body, so that the seal portion is brought in to contact with the notched opening portion and the fixing portion is fixed to the engagement portion.

According to the present invention, there is also provided a grommet assembling jig for assembling a grommet constituted by a first division body and a second division body, the first division body having a seal portion to be brought into contact with a notched opening portion of a box body, and the second division body having a fixing portion to be engaged with an engagement portion of the box body, comprising:

a mounting portion, on which the seal portion is fitted when the first division body is mounted on the grommet assembling jig; and a guide portion, guiding the fixing portion when the second division body is assembled with the first division body, wherein the mounting portion corresponds to the notched opening portion; and wherein the guide portion corresponds to the engagement portion.

Preferably, the fixing portion has a through hole. The guide portion passes through the through hole of the fixing portion when the second division body is assembled with the first division body.

According to the method of assembling the grommet and the grommet assembling jig for assembling the grommet constituted in this way, since the grommet assembling jig includes the guide portion for guiding the fixing portion, fitting operation can easily be carried out by mounting the first division body to the jig and fitting the second division body onto the first division body while guiding the fixing portion by the guide portion.

Therefore, even when locking member formed on a lower face side of the second division body to be fitted to the first division body from the upper side cannot optically be observed, the locking member can accurately be positioned onto the first division body and therefore, remarkable promotion of fitting operability can be achieved.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A detailed explanation will be given of an embodiment of a method of assembling a grommet and a jig for assembling a grommet according to the present invention in reference to FIG. 1 through FIG. 7 as follows.

Figure 1:
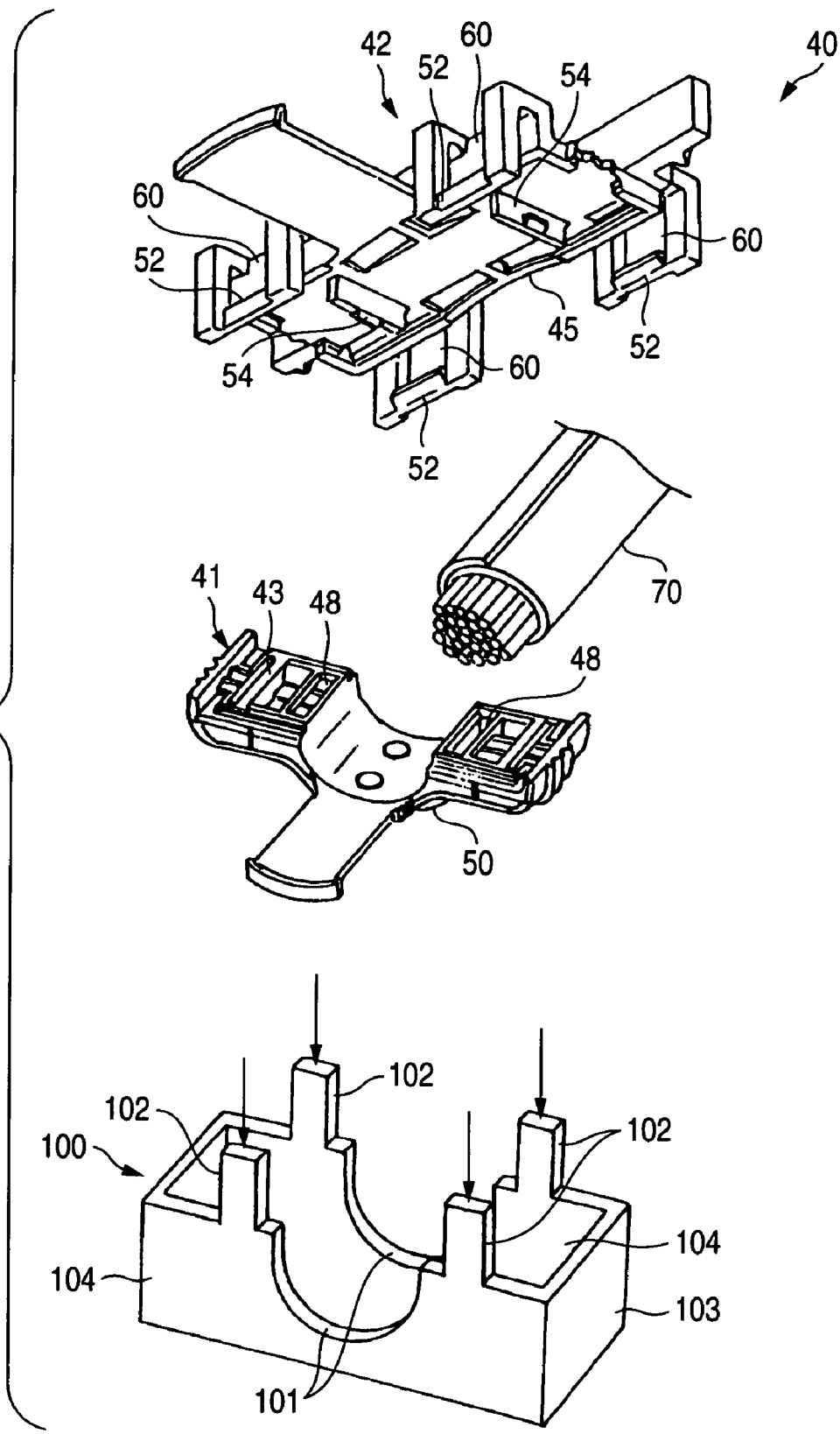
FIG. 1 illustrates perspective views of outlooks of respective parts for explaining a method of assembling a grommet according to an embodiment of the invention.

As shown in FIG. 1, a grommet 40 includes a first division 41 having waterproof ribs (seal portions) 50 brought into contact with notched opening portions 16, 19 (refer to FIG. 3) formed at a box main body 10 (refer to FIG. 2) and a second division 42 having grommet side fitting portions 52 fixed to box main side fixing portions 20 (refer to FIG. 3) provided at end portions of the notched opening portions 16, 19 for inserting a wire harness 70.

A method of assembling a grommet according to the embodiment is a method of assembling the grommet 40 constituted by two parts and inserted with the wire harness 70. A grommet assembling jig 100 is installed on an assembling operation base. The grommet assembling jig 100 has notched recess portions 101 corresponding to the notched opening portions 16, 19 of the box main body and guide portions 102 corresponding to the box main body side fixing portions 20 for guiding the grommet side fixing portions 52.

The first division 41 is mounted to the notched recess portion 101 of the grommet assembling jig 100. The wire harness 70 is arranged on the first division 41. Thereafter, the second division 42 is fitted onto the first division 41 while guiding the grommet side fixing portions 52 of the second division 42 by the guide portions 102 to thereby form the grommet 40 inserted with the wire harness 70.

According to the grommet assembling jig 100, a pair of side plates 104 of a base 103 constituting a shape of a quadrangular cylinder are formed with the notched recess portions 101 recessed to cut to remove substantially in a semicircular shape from upper end portions thereof. The notched recess portions 101 are corresponded to the notched opening portions 16, 19 formed at a grommet attaching portion 14 of the box main body 10 shown in FIG. 3. Further, two pairs of the guide portions 102 are projected from upper end edges of the side plates 104 on both sides of the notched recess portions 101.

The guide portions 102 are corresponded to the grommet side fixing portions 52 projected from four corners of a second division main body 45 provided to the second division 42. By inserting the guide members 102 into respective clearance portions 60 which are formed between the grommet side fixing portions 52 and the second division main body 45, the guide portions 102 are positioned above the first division 41 arranged with the wire harness at an upper portion thereof and positioned to the notched recess portions 101.

Further, the first division 41 and the second division 42 are integrally assembled by retaining projections 54 formed at the second division main body 45 by retaining holes 48 formed at the first division main body 43 of the first division 41.

Figure 2:
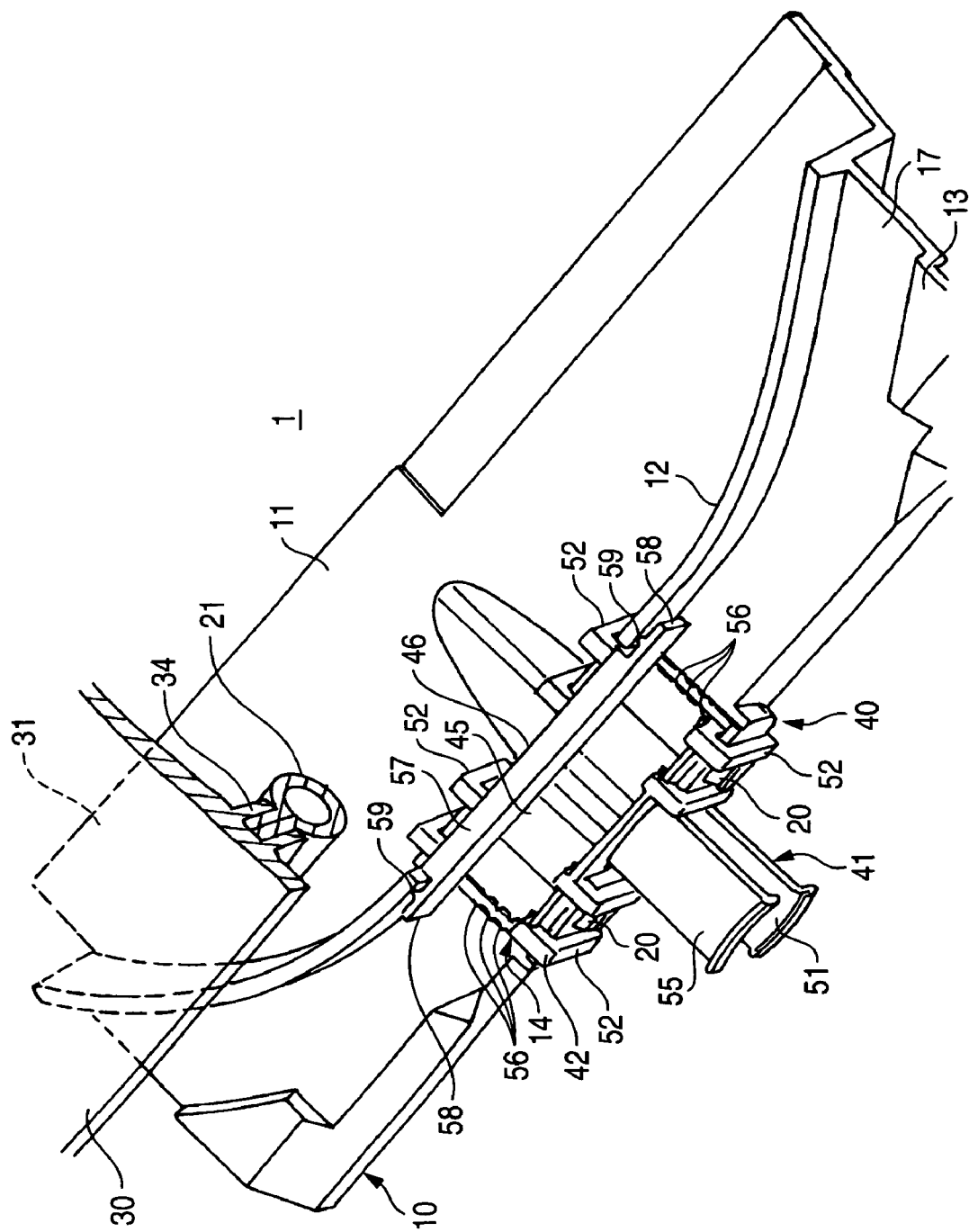
FIG. 2 is a perspective view of an outlook of a grommet provided by the method of assembling the grommet shown in FIG. 1.
Figure 3:
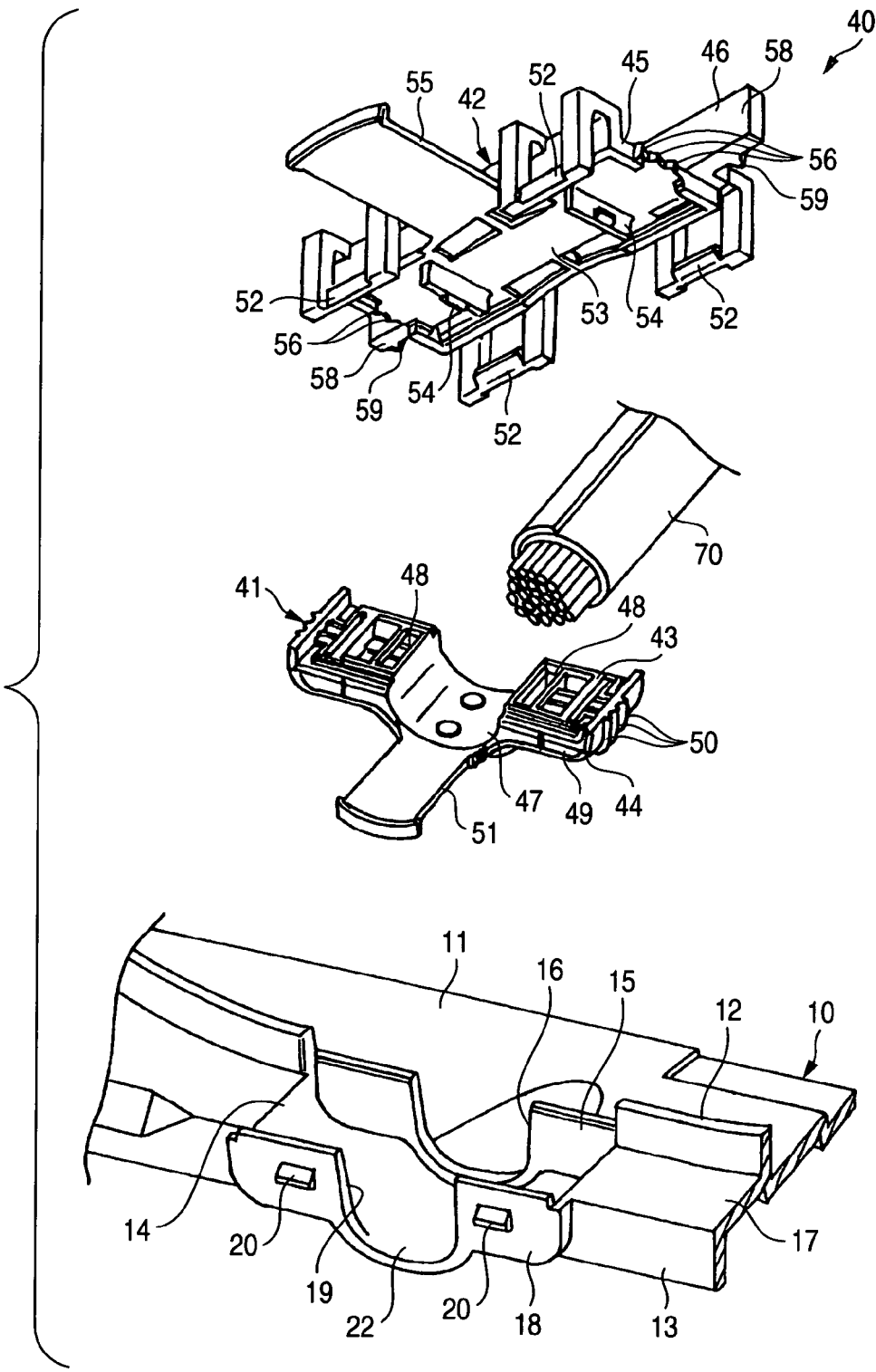
FIG. 3 illustrates perspective views of outlooks for explaining a relationship of assembling respective parts in the grommet shown in FIG. 2.
Figure 4:
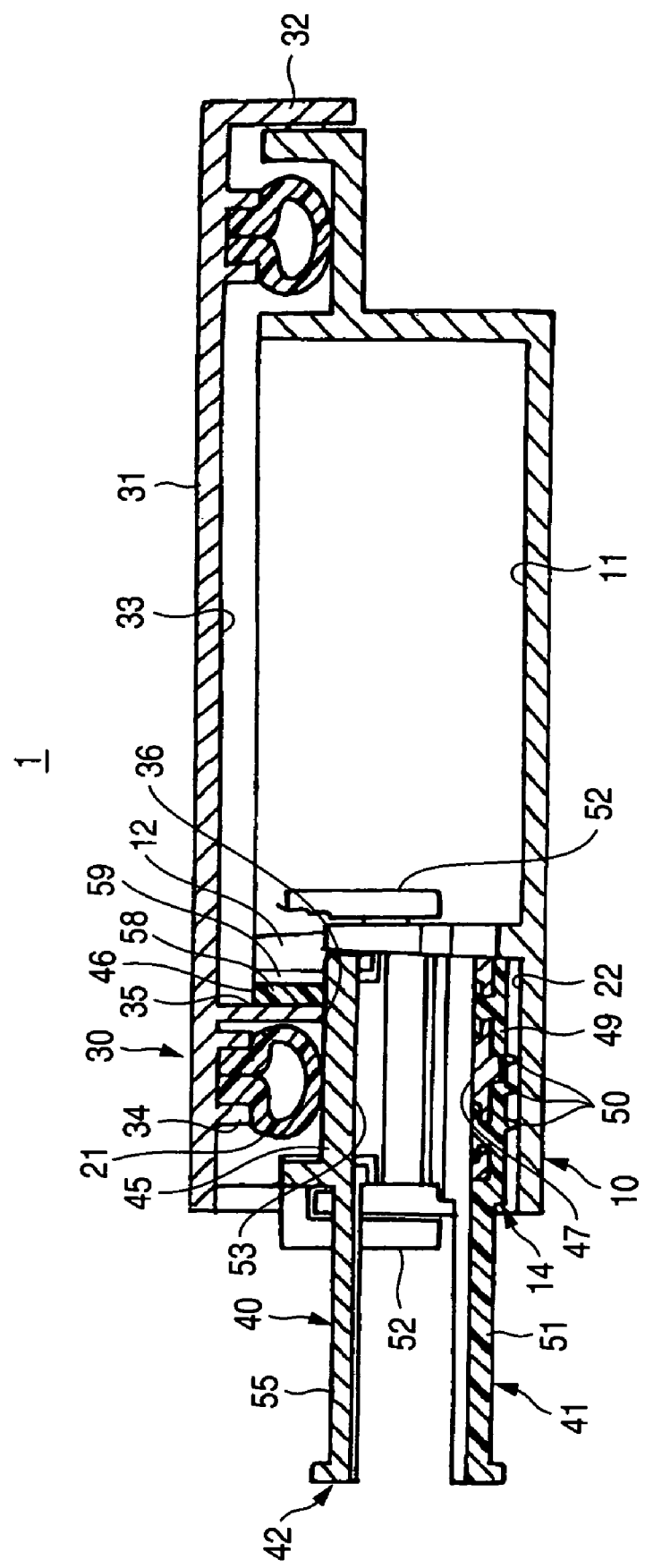
FIG. 4 is a vertical sectional view of a waterproof box shown in FIG. 2.

As shown in FIGS. 2 through 4, a waterproof box 1 in which the grommet 40 is used includes the box main body 10 and a lid member 30. The box main body 10 includes a bottom plate 11, a peripheral wall 12 and an outer side plate 13.

A portion of the peripheral wall 12 is formed with a partition plate 15 and the notched opening portions 16 constituting a portion of the grommet attaching portion 14. The partition wall 15 is arranged at a position lowered from an end portion of the peripheral wall 12 via a stepped portion. The notched opening portions 16 is formed by being cut to remove in a semicircular shape at a central portion of the partition plate 15.

Further, the pair of box main body side fixing portions (not illustrated) are projected from both side portions of the notched opening portion 16 in the partition plate 15.

The outer side plate 13 is arranged on an outer peripheral side of the peripheral wall 12 via an elastic press contact portion 17 and a portion of the outer side plate 13 is formed with a partition plate 18 and the notched opening portion 19 constituting other portion of the grommet attaching portion 14. Further, the pair of box main body side fixing portions 20 are projected from both side potions of the notched opening portion 19 in the partition plate 18. An elastic seal portion 21 constituting an endless shape is brought into press contact with the elastic press contact portion 17.

As shown in FIG. 2, an outer edge portion of a ceiling plate 31 of the lid member 30 is formed with a flange portion 32 attached to cover an outer peripheral portion of the outer side plate 13 of the box main body 10.

An elastic seal fittingly attaching portion 34 is mounted with the elastic seal portion 21 and therefore, by fitting the lid member 30 to the box main body 10, the elastic seal portion 21 is brought into press contact with the elastic press contact portion 17 of the box main body 10 to elastically deform.

Further, a portion of the lid member 30 in correspondence with the grommet attaching portion 14 is formed with a pair of press projections 35 projected from a lower face 33 thereof to the box main body 10 by constituting a rod-like shape. The press projections 35 are arranged in correspondence with waterproof ribs 59 of a second seal portion 46 provided at the second division 42 of the grommet 40.

Further, front end portions of the press projections 35 are formed with taper faces 36 for being prevented from impinging on an upper portion of the second seal portion 46 at inner faces thereof when the lid member 30 is fitted to cover the box main body 10.

Figure 5:
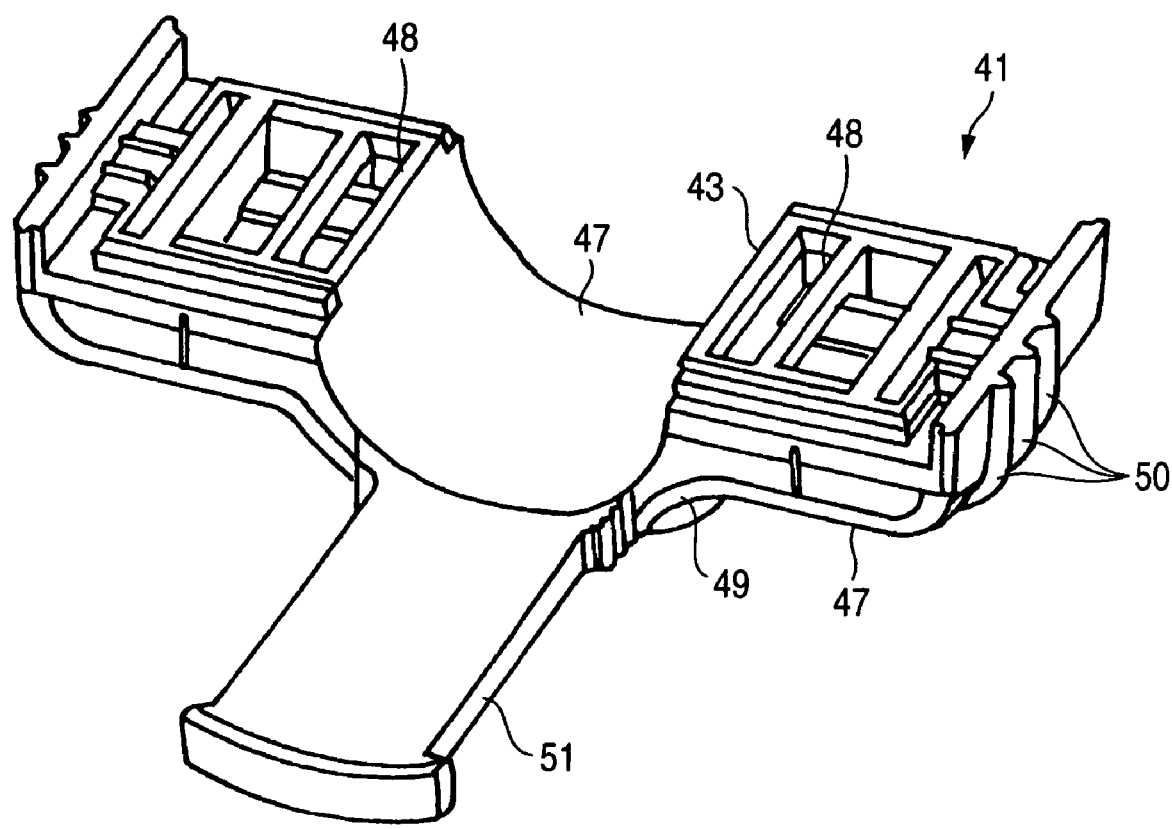
FIG. 5 is a perspective view of an outlook of a single member of a first division of the grommet shown in FIG. 2.

As shown in FIGS. 3 and 5, the first division 41 constituting the grommet 40 has a first division main body 43 and a first seal portion 44. A total of the first division main body 43 is formed substantially in an I-like plate shape.

A central portion of an upper face of the first division main body 43 is formed with a harness supporting portion 47 bent in a semicircular shape in correspondence with a grommet contact face 22 of the box main body 10. Further, both sides of the harness supporting portion 47 are formed with the pair of engaging holes 48 formed in the shape of the quadrangular hole.

The first seal portion 44 is formed substantially in a T-like plate shape. A portion of the first seal portion 44 constituting a top portion of the T-like shape is made to constitute a main body coupling portion 49 and therefore, integrally fitted to attach to a lower face of the first division main body 43. Three the waterproof ribs 50 are projected from an outer peripheral face of the main body coupling portion 49.

Further, a harness bundling portion 51 is formed to project from a central portion of the first seal portion 44 in correspondence with the harness supporting portion 47 of the first division main body 43.

Figure 6:
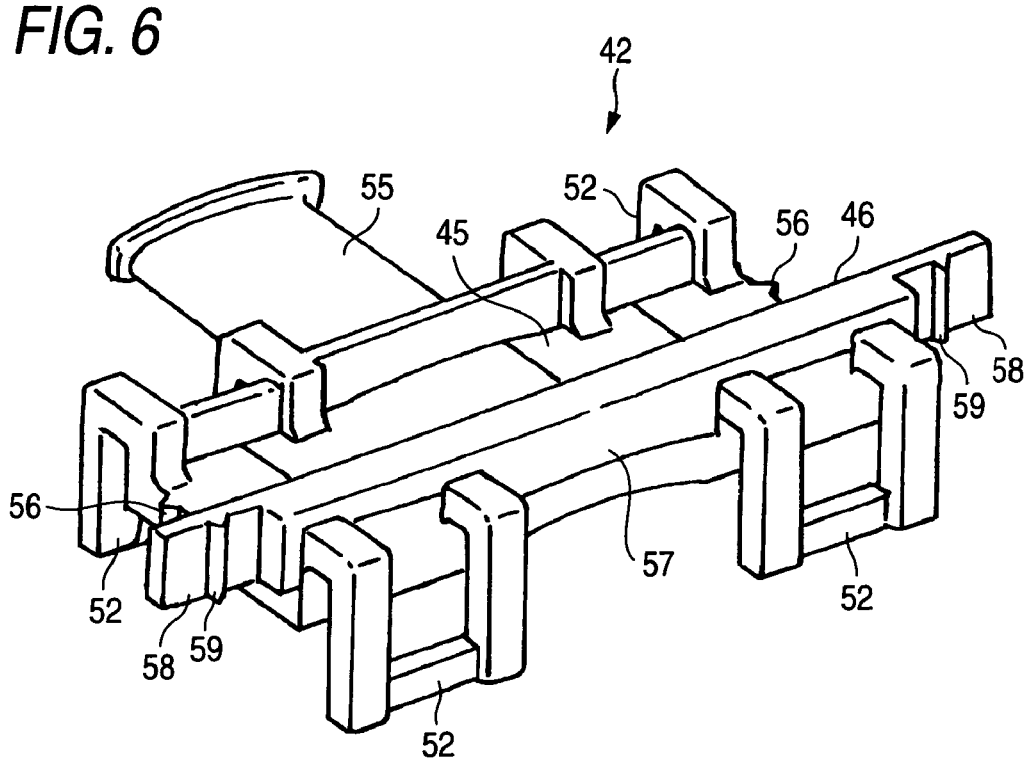
FIG. 6 is a perspective view of an outlook of a single member of a second division of the grommet shown in FIG. 2.
Figure 7:
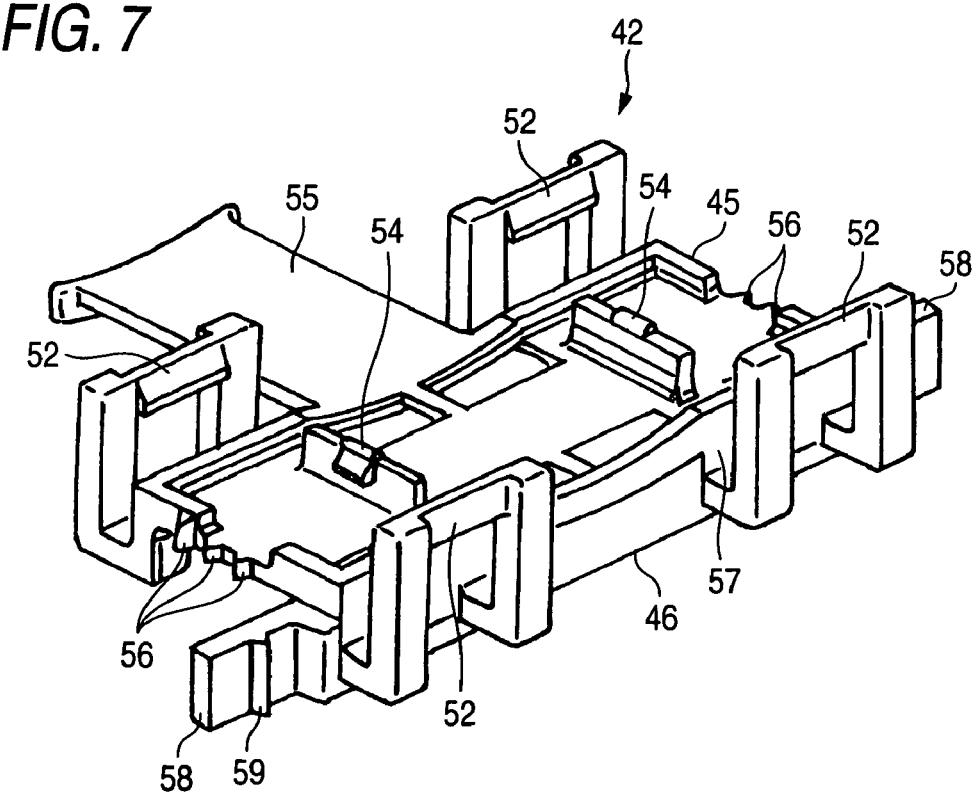
FIG. 7 is a perspective view of an outlook of the second division shown in FIG. 6 viewed from a lower side.
Figure 8A:
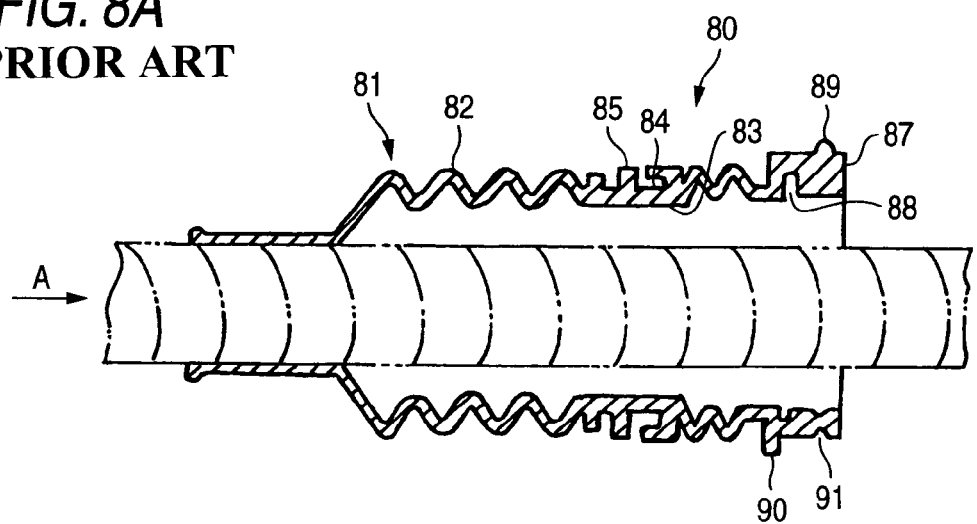
FIG. 8 illustrates explanatory views showing a constitution of a related grommet.
Figure 8B:
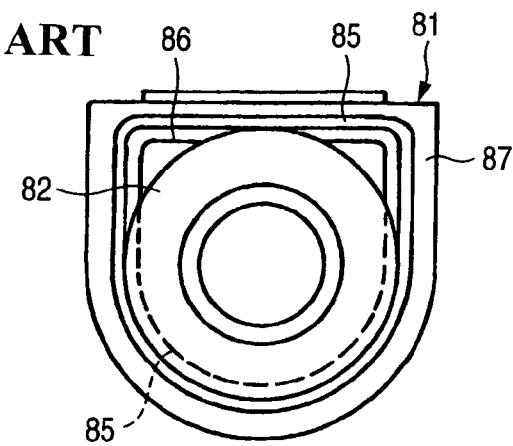

As shown in FIGS. 6 and 7, the second division 42 constituting the grommet 40 has the second division main body 45 and the second seal portion 46.

The second division main body 45 is formed substantially in a T-like plate shape. The grommet side fixing portions 52 constituting a shape of a square cylinder are formed to project from four corners of the second division main body 45 to a lower side.

The respective grommet side fixing portions 52 are used for fixing the grommet 40 to the box main body 10 by being fitted to attach to the respective box main body side fixing portions 20 provided at the grommet attaching portion 14 of the box main body 10.

Further, a harness supporting portion 53 opposed to the harness supporting portion 47 of the first seal portion 44 is formed to project from a lower face of the second division main body 45. The pair of retaining projections 54 in correspondence with the pair of retaining holes 48 of the first division main body 43 are formed to project therefrom. The retaining projections 54 are used for coupling the two divisions 42, 41 by being retained by the retaining holes 48 of the first division main body 43 when the second division 42 is assembled to the first division 41.

A harness bundling portion 55 in correspondence with the harness bundling portion 51 of the first seal portion 44 is formed to project from the second division main body 45.

Further, side portions of the second division main body 45 are formed with two pairs of three pieces of the rib projections 56 in correspondence with the waterproof ribs 50 of the first seal portion 44.

The second seal portion 46 is formed with thin plate portions 58 having a plate thickness smaller than that of a base portion 57 are formed at both end portions of the base portion 57 formed substantially in an I-like plate shape. Further, central portions of the thin plate portions 58 are formed with waterproof ribs 59 having a length in an upper and down direction and extended in a direction of mounting the grommet 40.

Further, the second seal portion 46 is fixed on this side of FIG. 5 in correspondence with a side of the peripheral wall 12 of the box main body 10 at an upper face of the second division main body 45. Therefore, when the respective grommet side fixing portions 52 of the second division 42 are fitted to attach to the respective box main body side fixing portions 20 provided at the grommet attaching portion 14 of the box main body 10 to fix the grommet 40 to the box main body 10, the waterproof ribs 59 are brought into contact with the peripheral wall 12 of the box main body 10. Thereby, the thin plate portions 58 are elastically deformed in a direction of separating from the peripheral wall 12 to thereby prevent the waterproof ribs 59 from pressing more than necessary to smoothly assemble the grommet 40.

Further, when fitting of the lid member 30 to the box main body 10 is progressed, the taper faces 36 of the press projections 35 provided at the lid member 30 impinge on the thin plate portions 58 of the second seal portion 46. Thereby, the press projections 35 are inserted to rear sides of the thin plate portions 58 while preventing the press projections 35 from directly impinging on the thin plate portions 58, the waterproof ribs 59 are brought into press contact with the peripheral walls 12 via the thin plate portions 58 to thereby achieve waterproof performance at a portion of the peripheral wall 12 of the grommet attaching portion 14.

According to the above described method of assembling the grommet and the above described jig for assembling the grommet, the first division 41 is mounted to the notched recess portion 101 on the assembling jig 100, the wire harness 70 is arranged on the first division 41 and thereafter, the second division 42 is fitted onto the first division 41 by guiding the grommet side fixing portions 52 of the second division 42 by the side portions 102 to thereby form the grommet. Therefore, promotion of positioning accuracy is achieved and a reduction in a number of steps can be achieved without needing skill by extremely simple integration.

Further, the method of assembling the grommet and the jig for assembling the grommet according to the invention are not limited to the above-described embodiment but can pertinently be modified and improved.

For example, although according to the above described embodiment, four the guide portions 102 are provided, the effect can sufficiently be achieved by at least two of the guide portions 102.

Otherwise, shapes, dimensions, modes, numbers, locations of arranging and the like of the wire harness, the first division and second division exemplified in the above described embodiment are arbitrary and not limited so far as these can achieve the invention.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A method of assembling a grommet, comprising the steps of:
   providing a grommet assembling jig which has a mounting portion and a guide portion;
   providing a first division body which has a seal portion;
   providing a second division body which has a fixing portion, the first division body and the second division body constituting the grommet;
   mounting the first division body on the grommet assembling jig so that the seal portion is fitted on the mounting portion;
   arranging a wire harness on the first division body; and
   assembling the second division body with the first division body by guiding the guide portion to the fixing portion.

2. The method as set forth in claim 1, wherein the fixing portion has a through hole, the guide portion passes through the through hole of the fixing portion in the assembling step.

3. The method as set forth in claim 1, further comprising the steps of:
   providing a box body which has a notched opening portion corresponding to the mounting portion and which has an engagement portion;
   removing the grommet assembling jig from the first and second division bodies after the assembling step; and
   mounting the assembled first and second division bodies to the box body, so that the seal portion is brought into contact with the notched opening portion and the fixing portion is fixed to the engagement portion.

* * * * *